United States Patent [19]

Murphy, deceased

[11] Patent Number: 5,409,997
[45] Date of Patent: Apr. 25, 1995

[54] THERMALLY-STABLE MELT PROCESSIBLE FLUOROPOLYMER COMPOSITIONS AND PROCESS

[75] Inventor: Charles V. Murphy, deceased, late of Boca Raton, Fla., by Carol Finke, executrix

[73] Assignee: E. I. Du Pont de Nemours and Company, Wilmington, Del.

[21] Appl. No.: 143,763

[22] Filed: Nov. 1, 1993

[51] Int. Cl.$^6$ .................... C08F 259/08; C08F 275/00
[52] U.S. Cl. ..................... 525/274; 525/276; 525/326.3
[58] Field of Search ....................... 525/274, 276, 326.3

[56] References Cited

U.S. PATENT DOCUMENTS

| | | | |
|---|---|---|---|
| Re. 28,628 | 11/1975 | Carlson et al. | 204/159.2 |
| 3,624,250 | 11/1971 | Carlson | 260/80.75 |
| 4,123,602 | 11/1978 | Ukihaskh et al. | 526/206 |
| 4,155,823 | 5/1979 | Gotcher et al. | 204/159.17 |
| 4,353,961 | 10/1982 | Gotcher et al. | 428/380 |
| 4,853,164 | 8/1989 | Kiang et al. | 264/22 |
| 4,935,467 | 6/1990 | Cheng et al. | 525/199 |
| 5,091,471 | 2/1992 | Graves | 525/90 |
| 5,298,562 | 3/1994 | Ceska | 525/244 |

*Primary Examiner*—James J. Seidleck
*Assistant Examiner*—I. Zemel
*Attorney, Agent, or Firm*—Edwin Tocker

[57] ABSTRACT

This invention is a melt processible fluoropolymer composition having a thermally stable, non-volatile, non-fugitive coagent. The fluoropolymer is made from ethylene, tetrafluoroethylene and at least one monomer. The coagent preferably is a salt of an acrylic acid such as dimethacrylate or diacrylate. The composition is useful as a wire and cable coating, chemically resistant lining for pipes or vessels or a film or membrane. The fluoropolymer composition has good tensile strength particularly at high temperatures and has good heat aging properties. The composition may be crosslinked with low doses of radiation. A shaped article made from the composition and a method of making the shaped article are also claimed.

11 Claims, No Drawings

THERMALLY-STABLE MELT PROCESSIBLE FLUOROPOLYMER COMPOSITIONS AND PROCESS

BACKGROUND OF THE INVENTION

This invention pertains to a melt processible fluoropolymer/coagent composition, and more particularly to a melt processible fluoropolymer/coagent composition which is curable by radiation, and a process for making the same.

The fluoropolymer composition is particularly useful as a coating for wires or cables, such as telephone or electrical wires and cables. A number of important criteria must be considered when developing an insulation system for wire and cable. Although the importance of each criterion varies with the particular application, insulation systems generally require thermal stability, chemical resistance, good melt processibility, good insulation properties and reduced emissions of off gases at elevated temperatures. The fluoropolymer composition is also useful in other applications such as films and sheets and corrosion resistant linings for pipes or vessels.

Many efforts have been made to improve the physical characteristics of fluoropolymer compositions at high temperatures. For example, dipolymers of ethylene (E) and tetrafluoroethylene (TFE) are potentially useful in preparing various shaped articles, electric wire coating and corrosion resistant linings because of their high melting point. However, the tensile properties of the dipolymer deteriorates at high temperatues, limiting its utility. In particular, a wire coating becomes brittle at 200° C. and cracks at low stress.

U.S. Pat. No. 3,624,250 discloses adding a vinyl co-monomer to the ETFE fluoropolymer in order to alleviate brittleness at high temperatures. While sussesful in this respect, the modified ETFE copolymers would benefit from further improvement for wiring at high temperatures. Certain copper stabilizers are useful and the prior art also teaches irradiating the copolymer to improve some of the physical properties, particularly tensile strength.

U.S. Pat. No. 4,353,961 discloses a fluoropolymer composition containing relatively volatile crosslinking promoters, such as triallyl cyanurate or its isomer, triallyl isocyanurate, which overcomes premature crosslinking, the formation of gels or lumps, discoloration, voids in the final product of melt processible polymer compositions. However, the composition cannot be processed at temperatures above 250° C., requiring low extrusion temperatures to minimize the loss of crosslinking agent which results in low extrusion rates, and produces copious quantities of off gases when melt processed at temperatures above the melting point of the fluoropolymer. The prior art also discloses a composition comprising a blend of a thermoplastic polymer and a thermoplastic elastomer which lowers the stiffness of polymers such that it would be useful in applications requiring some flexibility such as wire and cable insulation and jacketing.

None of the references, however, suggest an approach to reducing the levels of off gases generated when the composition is processed at temperatures above the melting point of the fluoropolymers contained therein. The present invention is a fluoropolymer composition with a non-fugitive coagent, thereby substantially reducing the amount of off gases produced while maintaining or improving the physical properties of the polymer, particularly at high temperatures.

SUMMARY OF THE INVENTION

The present invention provides a hydrogen-containing, melt processible fluoropolymer composition with a thermally stable, non-fugitive, non-volatile coagent. The composition contains (a) a fluoropolymer of ethylene, tetrafluoroethylene and at least one additional monomer, preferably in a mole ratio of 35–60:60–35:1–6, and has a melting point above about 250° C., and (b) a coagent which is at least a difunctional component which is thermally stable at 200° C. and preferably higher than 200° C. Functionality of the coagent is defined by reactive groups, especially pendant reactive groups, such as vinyl, epoxide, peroxide or glycidal groups. Preferred coagents are acrylates, especially metallic diacrylates, such as zinc dimethacrylate or zinc diacrylate. Such coagents most preferably have a melting point greater than 250° C. The composition may be processed at increased extrusion rates. Optionally, it may be radiation crosslinked to improve the physical properties at elevated temperatures.

The composition may optionally contain an antioxidant, an acid scavenger, a polymer of vinylidene fluoride and/or copolymers of ethylene-trichloro-fluoro ethylene.

The present invention also provides a process for making the composition, a process for making an irradiated composition, and a wire and cable article.

DETAILED DESCRIPTION

The present invention provides a composition comprising:

(a) a fluoropolymer of ethylene, tetrafluoroethylene and at least one additional monomer, preferably in a mole ratio of 35–60:60–35:1–6 and having a melting point above about 250° C., and (b) a coagent which is at least a difunctional component which is thermally stable at 200° C. and preferably higher. Functionality of the coagent is defined by reactive groups, especially pendant reactive groups, such as vinyl, epoxide, peroxide or glycidal groups. Preferred coagents are acrylates, especially metallic diacrylates, such as zinc dimethacrylate or zinc dimethacrylate or zinc diacrylate. Such coagents preferably have a melting point greater than 250° C.

The weight ratio of the fluoropolymer to the coagent is preferably about 90–99.9: 10–0.1, most preferably 98–99.5:2.0–0.5.

The fluoropolymers that can be used in the compositions of this invention are copolymers of ethylene (E) and tetrafluoroethylene (TFE) with one or more additional monomers. At least one of the additional monomers introduces at least one polyvalent atom in one or more side groups into the polymer molecule. Polyvalent atoms include, for example, carbon and oxygen. Representative side groups include alkyl and alkyl ether (alkoxy). Side groups can be halogenated, desirably are perhalogenated, and preferably are perfluorinated. Representative additional monomers that introduce a single side group include perfluoroolefins, perfluoroalkyl ethylenes, and perfluoro (alkyl vinyl) ethers containing 3–10 carbon atoms, perferably 3–7 carbon atoms. Most, but not all, of such additional monomers introduce a single side group into the polymer molecule. A representative additional monomer that introduces two side groups is hexafluoroisobutylene (HFIB). Preferred additonal monomers include perfluorobutyl ethylene (PFBE), perfluoro(proplyl vinyl) ether (PPVE), and HFIB. Hexafluoropropylene (HFP), which introduces a side group containing only one carbon atom, is somewhat less efficient as a modifying monomer than one that introduces bulkier side groups but can be used alone or in conjunction with another monomer that does introduce bulky side chains, as disclosed in U.S. Pat. 4,381,387.

Various stabilizers for use in E/TFE copolymer resins are known. U.S. Pat. 4,267,098 discloses the addition of a phosphorous acid to E/TFE copolymers in order to avoid or significantly reduce the undesired thermal decomposition which occurs during processing at above 300° C., especially in the presence of oxygen. U.S. Pat. 4,110,308 discloses the use of copper or copper oxide as a stabilizer in E/TFE copolymers to prevent thermal deterioration, discoloration, embrittlement, and foaming when heated above 300° C. for a long period of time. U.S. Pat. 4,390,655 discloses cuprous chloride or iodide as a stabilizer for E/TFE copolymers to allow the coplymers to be exposed to very high temperatures in air without rapid loss in weight, molecular weight deterioration, color generation, or bubbling. Most commercial E/TFE copolymer resins incorporate copper stabilizers.

The term coagent as used herein refers to a component which is at least a difunctional component which is thermally stable at 200° C. and higher. Functionality of the coagent is defined by reactive groups, especially pendant reactive groups, such as vinyl, epoxide, peroxide or glycidal groups. Preferred coagents are acrylates, especially metallic diacrylates, such as zinc dimethacrylate or zinc dimethacrylate or zinc diacrylate. These coagents are generally incompatible with the fluoropolymer resins used in the present invention and are preferably stable at the processing temperature of the composition. Therefore, they may be dry blended with the fluoropolymer resins to produce the composition prior to processing of the final article. The coagent preferably has a melting point above 200° C., most preferably above 250° C. Unlike prior art coagents used in fluoropolymer compositions, these coagents are essentially thermally stable and non-fugitive at the processing temperatures of the composition. The term non-fugitive is used herein to mean not likely to evaporate, deteriorate, change, or fade. This property is measured by the retention by the composition of room temperature elongation after exposure to elevated temperatures.

The coagents provide the composition with improved mechanical properties, particularly at elevated temperatures. As such, the composition may be melt processed at temperatures well above the melting point of the fluoropolymer contained therein to achieve faster melt processing rates. For example, the composition may be melt extruded onto wire or cable at temperatures of about 280° C. to 325° C. When melt extruded at such temperatures, little to no volatilization of the coagent occurs. The non-fugitive nature of the coagent may permit lower concentrations of coagent to be used, which results in improved temperature aging performance.

Various additives may also be added to the composition. Such additives include for example, antioxidants, acid scavengers, UV stabilizers, flame retardants, pigments, and mixtures thereof. Such antioxidants include for example alkylated phenols, organic phosphite or phosphates, alkylidene polyphenols, thio-bis alkylated phenol, dilauryl thiodipropionate, dimyristyl thiodipropionate, distearyl thiodipropionate, and amines. Such UV stabilizers, include for example, [2,2'-thio-bis(4-t-octyl-phenolato)]-n-butylamine nickel and 3,5-ditertiarybutyl-p-hydroxybenzoic acid. Flame retardants include, for example, decabromodiphenyl ether, perchloropentacyclodecane, 1,2-bis(tetrabromophethalimido) ethylene. Such pigments include for example, titanium dioxide, antimony trioxide, zinc oxide, iron oxide, and the like. Ethylene-trichlorofluoroethylene (ECTFE) and polyvinylidene fluoride (PVDF) may optionally be included in the fluoropolymer composition.

Generally, the composition has good insulation properties and may be used for such purposes as shaped articles or coatings. The preferred use is as insulation for an elongated electrical conductor such as a wire or cable. Moreover, the composition advantageously has excellent thermal aging properties and retains all of the advantages of the prior art compositions, namely excellent processibility, good tensile properties especially at high temperatures, chemical resistance and heat resistance. In addition, during processing the composition does not become brittle, form lumps, gels or voids, deteriorate or discolor. As previously indicated, environmental problems arising from emission of off gases are minimized.

Another aspect of the invention is to provide a process for producing the composition. The composition may be dry blended prior to melt processing by means well known in the art. The fluoropolymer components may be produced by conventional means which are well known in the art. The coagent is then added to the fluoropolymer. Because the coagent is substantially incompatible with the fluoropolymer they must be dry blended.

Once the composition is blended it may be readily melt processed into a shaped article, such as a wire or cable coating, sheet, film or linings for pipes or vessels. Processing techniques include such known techniques as extrusion, casting, machining, injection molding, transfer molding, and the like. In the present invention, the preferred means of melt processing is melt extrusion. The thermal stability of the coagent and the excellent mechanical properties of the composition permit the composition to be melt extruded at temperatures higher than those used for conventional compositions. The temperature range for the melt processing of the composition of this invention is about from 280° C. to 310° C. As previously noted, these higher temperatures enable the composition to be extruded at significantly faster rates than conventional compositions, particularly compositions without the coagent.

The composition may also be exposed to ionizing radiation to effect cross-linking, which generally has the effect of improving tensile strength of melt processible fluoropolymers at high temperatures, particularly temperatures above 200° C.

The radiation used in the present invention should be of a sufficiently high energy so as to penetrate the thickness of the fluoropolymer being treated and to produce ionization therein. The energy level used is any energy level which penetrates the thickness of the polymer being irradiated under the atmospheric conditions employed. In the present invention, the energy level of the radiation should be at least 500,000 ev (electron volts), and preferably from 1-10 Mev. This radiation and suitable sources are known. The sources of this type of radiation include but are not limited to (1) gamma rays, (2) X-rays, (3) beta particles, (4) alpha particles, (5) a beam of electron, photons, deuterons, and the like. The preferred method of irradiation is the electron beam accelerator. It offers (1) high power and high throughput, (2) relatively low cost, (3) high dose rate, and (4) intrinsic safety. In addition, the electron beam accelerators may be turned off, therefore facilities are not required to operate continuously.

2. TEFZEL® with 2 wt % SARET®634 (commercially available from the Sartomer Company).

3. TEFZEL® with 2 wt % triallylisocyanurate.

Ten mil (0.010") compression molded plaques were made from each run and were electron beam irradiated at 5, 10 and 15 megarad dosage levels.

The plaques were thermally aged for one and two weeks at 230° C. prior to running room temperature and 200° C. tensile properties according to ASTM D1708. The tensile data before and after thermal aging are reported in Table I.

TABLE I

| Examples | 1 | | | | 2 | | | | 3 | | | |
|---|---|---|---|---|---|---|---|---|---|---|---|---|
| Fluoropolymer | TEFZEL® 200 | | | | TEFZEL® 200 | | | | TEFZEL® 200 | | | |
| Coagent | None | | | | SARET® 634 | | | | Triallylisocyanurate | | | |
| Coagent Wt % | 0.0 | | | | 2.0 | | | | 2.0 | | | |
| Emission of off-gases during extrusion | — | — | — | — | No | No | No | No | Yes | Yes | Yes | Yes |
| Radiation Dosage (Megarads Stress/Strain @ Room Temperature, No Aging | 0 | 5 | 10 | 15 | 0 | 5 | 10 | 15 | 0 | 5 | 10 | 15 |
| Tensile Strength, psi | 6982 | 5606 | 5762 | 6671 | 6487 | 5848 | 5305 | 4541 | 5950 | 5849 | 5404 | 5503 |
| Elongation (%) Stress/Strain @ 200° C., No Aging | 340 | 235 | 247 | 318 | 215 | 279 | 238 | 209 | 261 | 151 | 105 | 115 |
| Tensile Strength, psi | 695 | 683 | 769 | 540 | 595 | 616 | 624 | 689 | 601 | 744 | 689 | 584 |
| Elongation (%) Thermal Aging 168 hrs @ 230° C. Stress/Strain @ 200° C. | 375 | 359 | 351 | 340 | 284 | 332 | 375 | 394 | 290 | 230 | 186 | 89 |
| Tensile Strength, psi | 565 | 552 | 712 | 630 | 563 | 751 | 764 | 976 | 481 | 672 | 670 | 669 |
| Elongation (%) Thermal Aging 336 hrs @ 230° C. Stress/Strain @ 200° C. | 41 | 116 | 334 | 187 | 97 | 427 | 183 | 237 | 36 | 97 | 75 | 61 |
| Tensile Strength, psi | 345 | 570 | 624 | 590 | 649 | 620 | 747 | 760 | 485 | 644 | 691 | 591 |
| Elongation (%) | 29 | 102 | 170 | 118 | 49 | 174 | 91 | 122 | 28 | 63 | 71 | 50 |

In the irradiation process the composition is exposed to radiation for a sufficient time and at sufficient dose to cause an increase in tensile properties while reducing or eliminating degradation. The total dosage should be from about 1-15 megarads, preferably 2.5-10 megarads, most preferably 4-6 megarads. Doses higher than about 15 megarads may adversely affect the composition, such as by leading to its degradation. Doses lower than about 1 megarad do not provide an appreciable improvement in the properties of the composition. Irradiation may be carried out at room temperature, although higher temperatures may be useful.

The compositions of this invention generally may be crosslinked at relatively low radiation dosage levels which results in lower radiation costs and reduction in the potential for adverse effects, such as degradation. In addition, the crosslinked composition exhibits outstanding thermal aging and 200° C. stress/strain properties. The tensile strength and elongation properties of the compositions were tested at 200° C. according to ASTM D 1708.

EXAMPLES

Examples 1-3

The following blends were mixed on a Brabender Plastograph Model PL 2000 extruder using a transition screw:

1. TEFZEL® (commercially available from E. I. du Pont de Nemours and Company) with no coagent;

Unexpectedly, the blend containing the 2 wt% SARET®634 (metallic dimethacrylate) showed no evidence of emission of off gases when extruded at 307° C. to 325° C., while the blend containing triallylisocyanurate (Example 3) showed severe emission of off gases when extruded at 307° C. to 325° C. as well as at 270° C. to 280° C.

The data in Table I clearly show the TEFZEL®200/2 wt% SARET®634 blend at 5 megarad radiation dosage level gives the best combination of improved tensile strength and elongation to break properties, particularly following thermal aging when compared to either the TEFZEL® with no coagent or the TEFZEL® with a 2 wt % triallylisocyanurate.

Examples 4-11

The following fluoropolymer/metallic dimethacrylate blends were processed on the Brabender and compression molded 10 mil (0.010") plaques were made, radiation crosslinked and tested as described in Examples 1-3. The goal was to evaluate ETFE with high ethylene content (TEFZEL® and TEFZEL®280) vs. low ethylene content (HT-2127 -commercially available from E. I. du Pont de Nemours and Company) and to evaluate a high molecular weight fluoropolymer resins (TEFZEL®280) vs. a lower molecular weight fluoropolymer resin (TEFZEL®200) from the standpoint of radiation dosage and high temperature aging properties (3 weeks/504 hours aging at 230° C.). The results of these tests are reported in Table II.

TABLE II

| Examples | 4 | 5 | 6 | 7 | 8 | 9 | 10 | 11 |
|---|---|---|---|---|---|---|---|---|
| Fluoropolymer | TEFZEL® 200 | TEFZEL® 200 | TEFZEL® 200 | TEFZEL® 200 | TEFZEL® 200 | TEFZEL® 280 | HT-2127 | HT-2127 |

TABLE II-continued

| Examples | 4 | 5 | 6 | 7 | 8 | 9 | 10 | 11 |
|---|---|---|---|---|---|---|---|---|
| Coagent Wt % | 0 | 0.5 | 1.0 | 2.0 | 5.0 | 2.0 | 0 | 2 |
| Radiation - 0 Megarads | | | | | | | | |
| No Thermal Aging | | | | | | | | |
| Tensile Strength, psi | 663 | 620 | 598 | 547 | 461 | 552 | 689 | 550 |
| Elongation (%) | 358 | 288 | 285 | 191 | 52 | 214 | 516 | 328 |
| Aged 3 Weeks @ 230° C. | | | | | | | | |
| Tensile Strength, psi | 485 | 483 | 478 | 487 | 478 | 514 | 249 | 409 |
| Elongation (%) | 40 | 43 | 45 | 57 | 29 | 56 | 52 | 422 |
| Radiation - 5 Megarads | | | | | | | | |
| No Thermal Aging | | | | | | | | |
| Tensile Strength, psi | 552 | 532 | 574 | 554 | 501 | 522 | 468 | 480 |
| Elongation (%) | 303 | 251 | 307 | 287 | 47 | 217 | 449 | 360 |
| Aged 3 Weeks @ 230° C. | | | | | | | | |
| Tensile Strength, psi | 574 | 786 | 917 | 738 | 596 | 620 | 492 | 692 |
| Elongation (%) | 179 | 259 | 313 | 233 | 55 | 91 | 441 | 521 |

These results show that fluoropolymers containing the higher ethylene level, provide the best balance of tensile and elongation to break properties after 3 weeks thermal aging at 230° C.

Examples 12–15

The following fluoropolymer/coagent blends were extrusion processed on the Brabender and compression molded 10 mil (0.010′) plaques were made, radiation crosslinked and tested as described in Example 1. The goal was to evaluate the following different coagents:
1. SARET ®634
2. SARET ®633
3. SARET ®517

The fluoropolymer/SARET ®517 (2 wt%) blend gave off copious quantities of gas during melt extrusion. The degree of gas emission was about the same as that observed in Example 3.

The fluoropolymer/SARET ®633 (2 wt%) coagent blend showed very slight gas emission during melt extrusion as opposed to fluoropolymer/SARET ®634 blend which showed no gas emission at the die during melt extrusion. The results of thermal aging tests are shown in Table III.

TABLE III

| EXAMPLES | 12 | | | 13 | | | 14 | | | 15 | | |
|---|---|---|---|---|---|---|---|---|---|---|---|---|
| Fluoropolymer | TEFZEL ® 200 | | | TEFZEL ® 200 | | | TEFZEL ® 200 | | | TEFZEL ® 200 | | |
| Coagent | SARET ® 634 | | | SARET ® 634 | | | SARET ® 633 | | | SARET ® 517 | | |
| Coagent Wt % | 1.0 | | | 2.0 | | | 1.0 | | | 2.0 | | |
| Radiation Dosage (MR) | 0 | 5 | 10 | 0 | 5 | 10 | 0 | 5 | 10 | 0 | 5 | 10 |
| Stress/Strain @ 200° C., No Aging | | | | | | | | | | | | |
| Tensile Strength, psi | 598 | 574 | 573 | 541 | 554 | 622 | 615 | 558 | 601 | 584 | 729 | 678 |
| Elongation (%) | 285 | 307 | 292 | 191 | 287 | 387 | 279 | 309 | 317 | 259 | 444 | 367 |
| Stress/Strain @ 200° C., 504 hrs aging @ 230° C. | | | | | | | | | | | | |
| Tensile Strength, psi | 509 | 917 | 767 | 534 | 738 | 776 | 537 | 725 | 706 | 510 | 643 | 692 |
| Elongation (%) | 48 | 313 | 147 | 62 | 233 | 184 | 43 | 257 | 94 | 59 | 129 | 108 |

The thermal aging data reported in Table III shows that the SARET ®634 (zinc dimethacrylate) coagent generally provides better thermal aging properties compared to the SARET ®633 (zinc diacrylate) coagent at 1.0 wt% coagent concentration. The thermal aging properties for the compositions containing the SARET ®5 17 (trifunctional acrylate) coagent were inferior to those with the SARET ®634 and SARET ®633 coagents.

Examples 16–20

The following fluoropolymer/SARET ®634 blends were extrusion processed on the Brabender and compression molded 10 mil (0.010″) plaques were made, radiation crosslinked and tested as described in Example 1. The results of thermal aging tests are reported in Table IV.

TABLE IV

| | FLUOROPOLYMER: TEFZEL ® 200 COAGENT: SARET ® 634 | | | | | | | | | |
|---|---|---|---|---|---|---|---|---|---|---|
| | Stress/Strain Properties at 200° C. | | | | | | | | | |
| Example | 16 | | 17 | | 18 | | 19 | | 20 | |
| Coagent, Wt % | 0.0 | | 0.5 | | 1.0 | | 2.0 | | 5.0 | |
| Radiation, Aging | Tensile Strength (psi) | Elongation (%) | Tensile Strength (psi) | Elongation (%) | Tensile Strength (psi) | Elongation (%) | Tensile Strength (psi) | Elongation (%) | Tensile Strength (psi) | Elongation (%) |
| 0 Megarad, No Aging | 663 | 358 | 620 | 288 | 598 | 285 | 547 | 191 | 561 | 52 |
| 0 Megrad, 3 wks aging @ 230° C. | 485 | 40 | 483 | 43 | 478 | 45 | 487 | 57 | 478 | 29 |

TABLE IV-continued

FLUOROPOLYMER: TEFZEL ® 200
COAGENT: SARET ® 634

Stress/Strain Properties at 200° C.

| Example | 16 | | 17 | | 18 | | 19 | | 20 | |
|---|---|---|---|---|---|---|---|---|---|---|
| Coagent, Wt % | 0.0 | | 0.5 | | 1.0 | | 2.0 | | 5.0 | |
| Radiation, Aging | Tensile Strength (psi) | Elongation (%) | Tensile Strength (psi) | Elongation (%) | Tensile Strength (psi) | Elongation (%) | Tensile Strength (psi) | Elongation (%) | Tensile Strength (psi) | Elongation (%) |
| 5 Megarads, No Aging | 552 | 303 | 532 | 251 | 574 | 307 | 554 | 287 | 501 | 47 |
| 5 Megarads, 3 wks aging @ 230° C. | 574 | 179 | 786 | 259 | 917 | 313 | 738 | 233 | 596 | 55 |
| 10 Megarads, No Aging | 635 | 367 | 611 | 346 | 573 | 292 | 622 | 387 | 490 | 89 |
| 10 Megarads, 3 wks aging @ 230° C. | 563 | 110 | 715 | 152 | 767 | 147 | 776 | 184 | 639 | 44 |
| 15 Megarads, No Aging | 566 | 338 | 656 | 389 | 724 | 405 | 620 | 352 | 488 | 149 |
| 15 Megarads, 3 wks aging @ 230° C. | 573 | 80 | 719 | 83 | 789 | 114 | 768 | 100 | 651 | 30 |

The thermal aging data reported in Table IV establishes that a preferred concentration of SARET®634 to be approximately 1%.

Examples 21–24

The following fluoropolymer/SARET®634 coagent blends were extrusion processed and pelletized using the Laboratory Brabender. The pelletized blends were melt extruded onto 24 AWG bare copper wire using a 60 mm single screw extruder. The following temperature profile was used:

| Barrel Rear | 302° C. |
|---|---|
| Center Rear | 304° C. |
| Center | 310° C. |
| Front | 316° C. |
| Adapter | 324° C. |
| Crosshead | 329° C. |
| Die Holder | 329° C. |
| Melt Temperature | 324° C. |

There was no evidence of gasing or fuming at the die during the extrusion. The results reported in Table V below were conducted on the insulations in accordance with MIL Spec 22759/41C:

TABLE V

| Example | 21 | 22 | 23 | 24 |
|---|---|---|---|---|
| TEFZEL ® 200 (wt. %) | 100 | 99.5 | 99.0 | 98.0 |
| SARET ® 634 Coagent (wt. %) | — | 0.5 | 1.0 | 2.0 |
| Insulation Thickness (mils) | 11 | 11 | 11 | 13 |
| Life Cycle Test, Pass (P)/Fail (F) 500 hours @ 230° C. Dielectric test, 2500 volts, 60 Hz | | | | |
| 0 megarads | 1/2P | 1/2P | 1/2P | 2/2P |
| 5 megarads | 2/2F | 2/2F | 2/2P | 2/2F |
| 10 megarads | 2/2F | 2/2F | 2/2F | 2/2F |
| 15 megarads | 2/2F | 1/2P | 1/2P | 2/2F |
| Dielectric Strength, V/mil ASTM D3032 | | | | |
| 0 Megarads | 2727 | 1219 | 1525 | 919 |
| 5 megarads | 2678 | 1234 | 1161 | 782 |
| 10 megarads | 3167 | 1284 | 1292 | 942 |
| 15 megarads | 2901 | 1898 | 1531 | 1084 |
| Cold Bend test, Pass (P)/Fail (F) Bend temperature −65° C. ± 3° C. 4 hrs/saline solution | | | | |
| 0 megarads | P | P | P | P |
| 5 megarads | P | P | P | P |
| 10 megarads | P | P | P | P |
| 15 megarads | P | P | P | P |

Table V demonstrates the impact of the coagent level on the retention of room temperature properties of tensile after aging at 230° C.

Examples 25–29

Table VI reports stress/strain properties of the compositions used in Examples 21–24.

TABLE VI

Fluoropolymer - TEFZEL ® 200
Coagent - SARET ® 634

| Example | 25 | | 26 | | 27 | | 28 | | 29 | |
|---|---|---|---|---|---|---|---|---|---|---|
| Coagent, Wt % | 0.0 | | 0.5 | | 1.0 | | 2.0 | | 5.0 | |
| Unannealed, Radiation, Aging | Tensile Strength (psi) | Elongation (%) | Tensile Strength (psi) | Elongation (%) | Tensile Strength (psi) | Elongation (%) | Tensile Strength (psi) | Elongation (%) | Tensile Strength (psi) | Elongation (%) |
| 0 Megarad, No Aging | 7007 | 309 | 6256 | 279 | 6367 | 285 | 6650 | 299 | 4518 | 127 |
| 0 Megarad, 1 wk @ 230° C. | 5061 | 282 | 4820 | 258 | 5147 | 294 | 4657 | 246 | 3646 | 76 |
| 0 Megarad, 2 wks @ 230° C. | 3750 | 221 | 4469 | 300 | 4478 | 292 | 4102 | 228 | 3365 | 54 |
| 0 Megarad, 3 wks @ 230° C. | 3474 | 50 | 3848 | 213 | 4567 | 308 | 4078 | 255 | 3222 | 43 |
| 5 Megarads, No Aging | 6554 | 308 | 5536 | 204 | 6012 | 303 | 5907 | 271 | 3863 | 52 |
| 5 Megarads, 1 wk @ 230° C. | 4174 | 134 | 4280 | 167 | 4215 | 165 | 4357 | 155 | 3727 | 36 |
| 5 Megarads, 2 wks @ 230° C. | 3793 | 77 | 3724 | 87 | 4000 | 107 | 3942 | 88 | 3575 | 22 |
| 5 Megarads, 3 wks @ 230° C. | 3504 | 45 | 3724 | 68 | 3738 | 63 | 3764 | 70 | 3549 | 21 |
| 10 Megarads, No Aging | 6467 | 301 | 5113 | 197 | 5171 | 235 | 5494 | 239 | 4204 | 72 |
| 10 Megarads, 1 wk @ | 3779 | 104 | 4384 | 124 | 4293 | 111 | 4210 | 123 | 3706 | 44 |

TABLE VI-continued

Fluoropolymer - TEFZEL ® 200
Coagent - SARET ® 634

| Example | 25 | | 26 | | 27 | | 28 | | 29 | |
|---|---|---|---|---|---|---|---|---|---|---|
| Coagent, Wt % | 0.0 | | 0.5 | | 1.0 | | 2.0 | | 5.0 | |
| Unannealed, Radiation, Aging | Tensile Strength (psi) | Elongation (%) | Tensile Strength (psi) | Elongation (%) | Tensile Strength (psi) | Elongation (%) | Tensile Strength (psi) | Elongation (%) | Tensile Strength (psi) | Elongation (%) |
| 230° C. | | | | | | | | | | |
| 10 Megarads, 2 wks @ 230° C. | 3431 | 54 | 3677 | 70 | 3669 | 50 | 3682 | 52 | 3033 | 12 |
| 10 Megarads, 3 wks @ 230° C. | 3883 | 49 | 3862 | 59 | 3855 | 56 | 3970 | 52 | 3561 | 0 |
| 15 Megarads, No Aging | 5933 | 244 | 5127 | 185 | 5855 | 235 | 5646 | 194 | 4427 | 42 |
| 15 Megarads, 1 wk @ 230° C. | 3505 | 104 | 4036 | 91 | 4205 | 82 | 4109 | 74 | 3347 | 25 |
| 15 Megarads, 2 wks @ 230° C. | 3284 | 39 | 3830 | 54 | 3691 | 59 | 3765 | 56 | 3111 | 0 |
| 15 Megarads, 3 wks @ 230° C. | 3455 | 39 | 3880 | 52 | 3912 | 56 | 3686 | 190 | 2123 | 5 |

Examples 30-33

Table VII reports the impact of the coagent level on the retention of room temperature tensile properties after aging at 230° C. for compositions of TEFZEL ® and SARET ®634 which has been extruded onto wire.

Examples 34-44

Table VIII reports the stress-strain properties of compositions using different coagents and different fluoropolymers.

TABLE VII

| | Fluoropolymer: TEFZEL ® 200 | | | |
|---|---|---|---|---|
| Example | 30 | 31 | 32 | 33 |
| Coagent: SARET ® 634, Wt % | 0 | 0.5 | 1.0 | 1.5 |
| Wire Conductor: 22 Gauge (32 mils Diameter), 19/34, silver plated copper conductor, 40 µ/inch | | | | |
| Insulation Thickness: Inches | 0.010 | 0.011 | 0.011 | 0.012 |
| Stress/Strain @ Room Temperature (23° C.) 0 Megarad Dosage Level | | | | |
| Tensile Strength, MPa (psi) | 59.93(8692) | 49.61(7195) | 59.79(7366) | 49.07(7117) |
| Elongation @ Break (%) | 390 | 292 | 289 | 306 |
| After Aging 500 hrs @ 230° C. Stress/Strain @ Room Temperature (23° C.) 0 Megarad Dosage Level | | | | |
| Tensile Strength, MPa (psi) | 30.7(4467) | 36.3(5269) | 35.7(5170) | 38.7(5617) |
| Elongation @ Break (%) | 44 | 245 | 213 | 315 |

TABLE VIII

| | Fluoropolymer resins: TEFZEL ® 200 | | | | | | | | | |
|---|---|---|---|---|---|---|---|---|---|---|
| Example | 34 | 35 | 36 | 37 | 38 | 39 | 40 | 41 | 42 | 43 | 44 |
| Fluoropolymer - TEFZEL ® GRADE | 200 | 200 | 200 | 200 | 200 | 200 | 200 | 2127 | 200 | 200 | 2127 |
| Coagents: | | | | | | | | | | | |
| SARET ® 634 Wt % | 1.0 | 0.5 | 0 | 0 | 2.0 | 0 | 2.0 | 2.0 | 5.0 | 0 | 0 |
| SARET ® 633 Wt % | 0 | 0 | 1.0 | 0.5 | 0 | 0 | 0 | 0 | 0 | 0 | 0 |
| SARET ® 517 Wt % | 0 | 0 | 0 | 0 | 0 | 2.0 | 0 | 0 | 0 | 0 | 0 |
| 0 Megarad Dosage, Original, No Thermal Aging S/S @ 200 C. | | | | | | | | | | | |
| Tensile Strength (psi) | 545 | 552 | 549 | 571 | 539 | 548 | 524 | 561 | 477 | 679 | 595 |
| Elong. @ Break, % | 271 | 270 | 239 | 286 | 369 | 316 | 195 | 387 | 113 | ?74 | 231 |
| After 1 wk Aging @ 230° C. S/S @ 200° C. | | | | | | | | | | | |
| Tensile Strength (psi) | 527 | 509 | 493 | 538 | 509 | 518 | 539 | 459 | 506 | 464 | 462 |
| Elong. @ Break, % | 45 | 49 | 33 | 49 | 61 | 75 | 123 | 451 | 32 | 40 | 550 |
| 5 Megarad Dosage Original, No Thermal Aging S/S @ 200° C. | | | | | | | | | | | |
| Tensile Strength (psi) | 607 | 576 | 583 | 602 | 608 | 680 | 525 | 442 | 470 | 544 | 497 |
| Elong. @ Break, % | 365 | 375 | 323 | 349 | 337 | 441 | 223 | 367 | 58 | 281 | 457 |
| After 1 wk. Aging @ 230° C. S/S @ 200° C. | | | | | | | | | | | |
| Tensile Strength (psi) | 939 | 877 | 859 | 802 | 787 | 740 | 670 | 621 | 607 | 590 | 468 |
| Elong. @ Break, % | 467 | 433 | 411 | 365 | 354 | 258 | 241 | 404 | 217 | 310 | 489 |
| After 2 wk. Aging @ 230° C. S/S @ 200° C. | | | | | | | | | | | |
| Tensile Strength (psi) | 811 | 766 | 747 | 719 | 800 | 657 | 623 | 604 | 565 | 590 | 365 |

TABLE VIII-continued

| | Fluoropolymer resins: TEFZEL ® 200 | | | | | | | | | | |
|---|---|---|---|---|---|---|---|---|---|---|
| Example | 34 | 35 | 36 | 37 | 38 | 39 | 40 | 41 | 42 | 43 | 44 |
| Elong. @ Break, % | 369 | 334 | 324 | 324 | 362 | 207 | 254 | 486 | 87 | 182 | 432 |

What is claimed is:

1. A composition comprising:
   (a) a fluoropolymer of ethylene, tetrafluoroethylene and at least one monomer having at least one polyvalent atom in one or more side chains, said fluoropolymer having a melting point above 250° C., and
   (b) a coagent comprising a difunctional compound, which is thermally stable at 200° C., said difunctional compound being selected from the group consisting of an acrylate or salt of an acrylic acid and compounds wherein the difunctionality is provided by the presence of vinyl, epoxide, peroxide, or glycidal groups.

2. A composition of claim 1 wherein the fluoropolymer and coagent are present in a weight ratio of about 99.9–90:0.1–10.0.

3. A composition of claim 1 wherein the coagent is present in about 0.5–2.0 weight percent of the composition.

4. A composition of claim 1 wherein the coagent is an acrylate or a salt of an acrylic acid.

5. A composition of claim 1 which is subjected to ionizing radiation at a dose level of up to about 10 megarads.

6. A composition of claim 1 wherein the ethylene, tetrafluoroethylene and monomer or monomers are in a mole ratio of 35–60:60–35:1–6.

7. A composition of claim 1 wherein the coagent has a melting point of 250° C. or higher.

8. A shaped article made from the composition of claim 1.

9. The composition of claim 4 wherein the coagent is metallic diacrylate.

10. The composition of claim 9 wherein the metal is zinc.

11. The composition of claim 10 wherein the coagent is zinc dimethacrylate or zinc diacrylate.

* * * * *